United States Patent
Koito et al.

(10) Patent No.: US 12,169,336 B2
(45) Date of Patent: Dec. 17, 2024

(54) OPTICAL ELEMENT

(71) Applicant: Japan Display Inc., Tokyo (JP)

(72) Inventors: Takeo Koito, Tokyo (JP); Kojiro Ikeda, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/132,016

(22) Filed: Apr. 7, 2023

(65) Prior Publication Data

US 2023/0244109 A1 Aug. 3, 2023

Related U.S. Application Data

(63) Continuation of application No. 17/706,870, filed on Mar. 29, 2022, now Pat. No. 11,650,464.

(30) Foreign Application Priority Data

Mar. 31, 2021 (JP) ................. 2021-062042

(51) Int. Cl.
*G02F 1/1339* (2006.01)
*G02F 1/1343* (2006.01)

(52) U.S. Cl.
CPC ...... *G02F 1/13394* (2013.01); *G02F 1/13398* (2021.01); *G02F 1/134309* (2013.01)

(58) Field of Classification Search
CPC ............. G02F 1/13394; G02F 1/13396; G02F 1/13398; G02F 1/134309; G02F 1/1345; G02F 1/13452; G02F 1/136204; G02F 2201/121; G02F 2201/124; G02F 2201/50; G02F 2201/503; G02F 2202/22
See application file for complete search history.

(56) References Cited

U.S. PATENT DOCUMENTS

| 2011/0285955 | A1 | 11/2011 | Nagasawa | |
|---|---|---|---|---|
| 2012/0194772 | A1* | 8/2012 | Moriwaki | G09F 9/30 349/138 |
| 2015/0103302 | A1* | 4/2015 | Nagasawa | G02F 1/1339 349/153 |

(Continued)

FOREIGN PATENT DOCUMENTS

| JP | H02-149919 U | 12/1990 |
|---|---|---|
| JP | 2004-093734 A | 3/2004 |

(Continued)

OTHER PUBLICATIONS

Office Action issued in related Japanese Patent Application No. 2021-062042, on Jul. 16, 2024 and English translation of same. 11 pages.

*Primary Examiner* — Angela K Davison
(74) *Attorney, Agent, or Firm* — K&L Gates LLP

(57) ABSTRACT

According to an aspect, an optical element includes: a first substrate including a first electrode; a second substrate stacked on the first substrate and including a second electrode; a liquid crystal layer provided between the first substrate and the second substrate; a sealing member extending along an outer periphery of the liquid crystal layer; a first spacer provided on an inner side of the sealing member; and a conductive column provided on an outer side of the sealing member and electrically connecting the first electrode and the second electrode. The conductive column and the first spacer include the same material.

8 Claims, 9 Drawing Sheets

(56) References Cited

U.S. PATENT DOCUMENTS

| | | | |
|---|---|---|---|
| 2016/0147096 A1 | 5/2016 | Wu et al. | |
| 2018/0307077 A1* | 10/2018 | Miura | E06B 9/24 |
| 2019/0171075 A1* | 6/2019 | Yoshida | G02F 1/136259 |
| 2019/0227391 A1 | 7/2019 | Kamitani et al. | |
| 2020/0409253 A1* | 12/2020 | Lee | G03F 7/0007 |
| 2021/0208439 A1 | 7/2021 | Abe | |

FOREIGN PATENT DOCUMENTS

| | | |
|---|---|---|
| JP | 2004-093844 A | 3/2004 |
| JP | 2008-076623 A | 4/2008 |
| JP | 2020-034612 A | 3/2020 |

* cited by examiner

OPTICAL ELEMENT

CROSS-REFERENCE TO RELATED APPLICATION

This application is a continuation of U.S. patent application Ser. No. 17/706,870, filed on Mar. 29, 2022, which application claims the benefit of priority from Japanese Patent Application No. 2021-062042 filed on Mar. 31, 2021, the entire contents of which are incorporated herein by reference.

BACKGROUND

1. Technical Field

What is disclosed herein relates to an optical element.

2. Description of the Related Art

A light adjustment panel as an exemplary optical element includes, for example, an upper substrate, a lower substrate, a liquid crystal layer sealed between the upper substrate and the lower substrate, and a spacer provided in the liquid crystal layer (refer to Japanese Patent Application Laid-open Publication No. 2020-34612, for example). In the light adjustment panel, the spacer is provided to maintain a cell gap as the distance between the upper substrate and the lower substrate. When incident light enters the light adjustment panel, the optical transmittance of the incident light is adjusted by the light adjustment panel, and transmitted light thus adjusted is output from the light adjustment panel.

Simplification has been desired for work of forming spacers in manufacturing an optical element such as a light adjustment panel.

For the foregoing reasons, there is a need for an optical element that can further simplify work of forming spacers for maintaining a cell gap as the distance between an upper substrate and a lower substrate.

SUMMARY

According to an aspect, an optical element includes: a first substrate including a first electrode; a second substrate stacked on the first substrate and including a second electrode; a liquid crystal layer provided between the first substrate and the second substrate; a sealing member extending along an outer periphery of the liquid crystal layer; a first spacer provided on an inner side of the sealing member; and a conductive column provided on an outer side of the sealing member and electrically connecting the first electrode and the second electrode. The conductive column and the first spacer include the same material.

According to an aspect, an optical element includes: a first substrate; a second substrate stacked on the first substrate; a liquid crystal layer provided between the first substrate and the second substrate; a sealing member extending along an outer periphery of the liquid crystal layer; and a second spacer provided on an inner side of the sealing member and contacting the first substrate and the second substrate. The sealing member and the second spacer include the same material.

DETAILED DESCRIPTION

Figure 1:
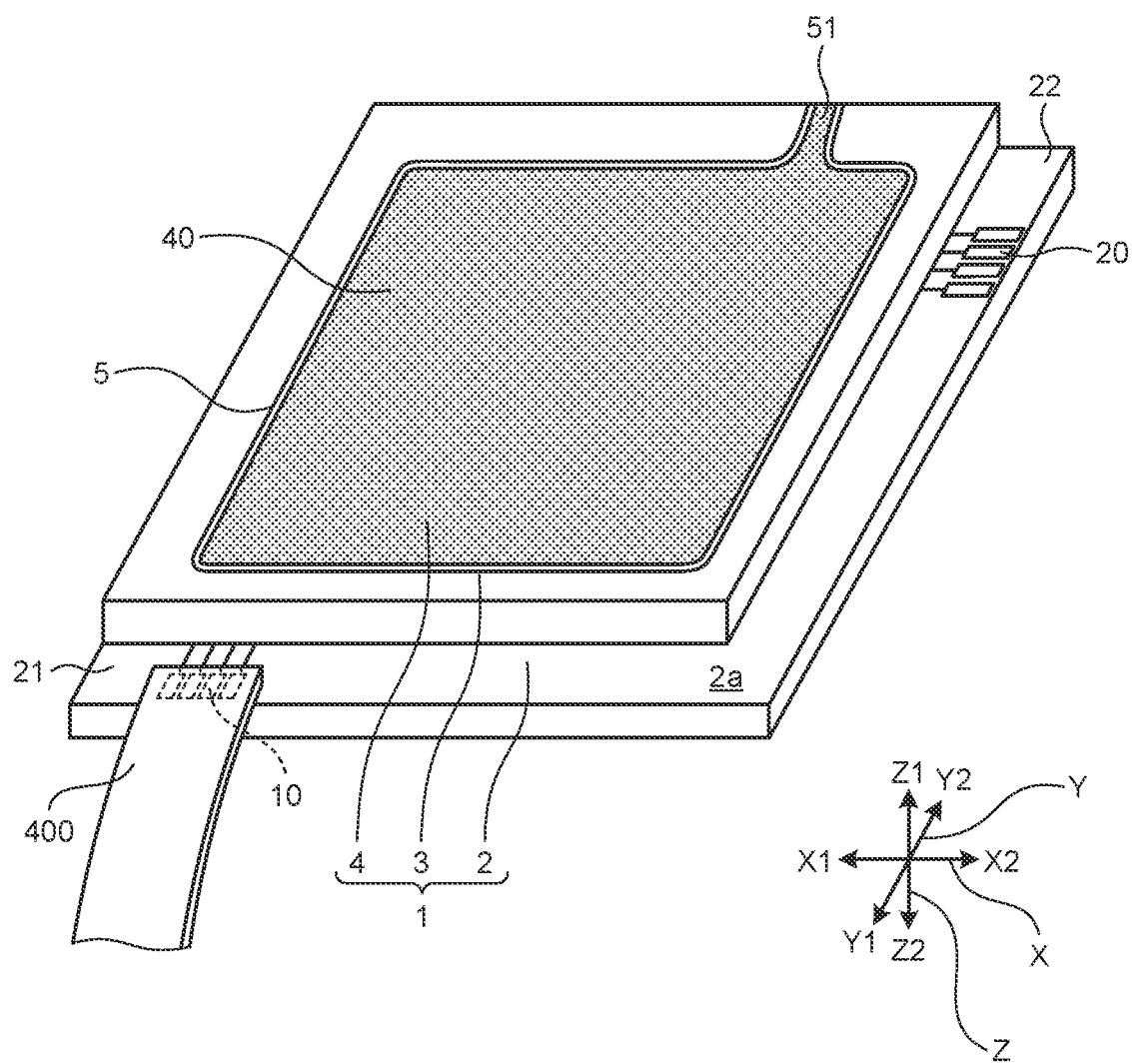
FIG. 1 is a perspective view of a light adjustment panel according to a first embodiment.

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below can be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In this disclosure, when an element is described as being "on" another element, the element can be directly on the other element, or there can be one or more elements between the element and the other element.

In an XYZ coordinate system illustrated in the drawings, an X direction is a right-left direction, and an X1 direction and an X2 direction are opposite to each other. The X1 direction is also referred to as a left direction, and the X2 direction is also referred to as a right direction. A Y direction is a front-back direction, and a Y1 direction and a Y2 direction are opposite to each other. The Y1 direction is also referred to as a front direction, and the Y2 direction is also referred to as a back direction. A Z direction is an up-down direction (stacking direction). A Z1 direction and a Z2 direction are opposite to each other. The Z1 direction is also referred to as an up direction, and the Z2 direction is also referred to as a down direction. An alignment film that controls the orientation of liquid crystal molecules is provided for wiring in an active region (refer to an active region 40 in FIG. 1) but is omitted in the drawings in some cases.

First Embodiment

Figure 2:
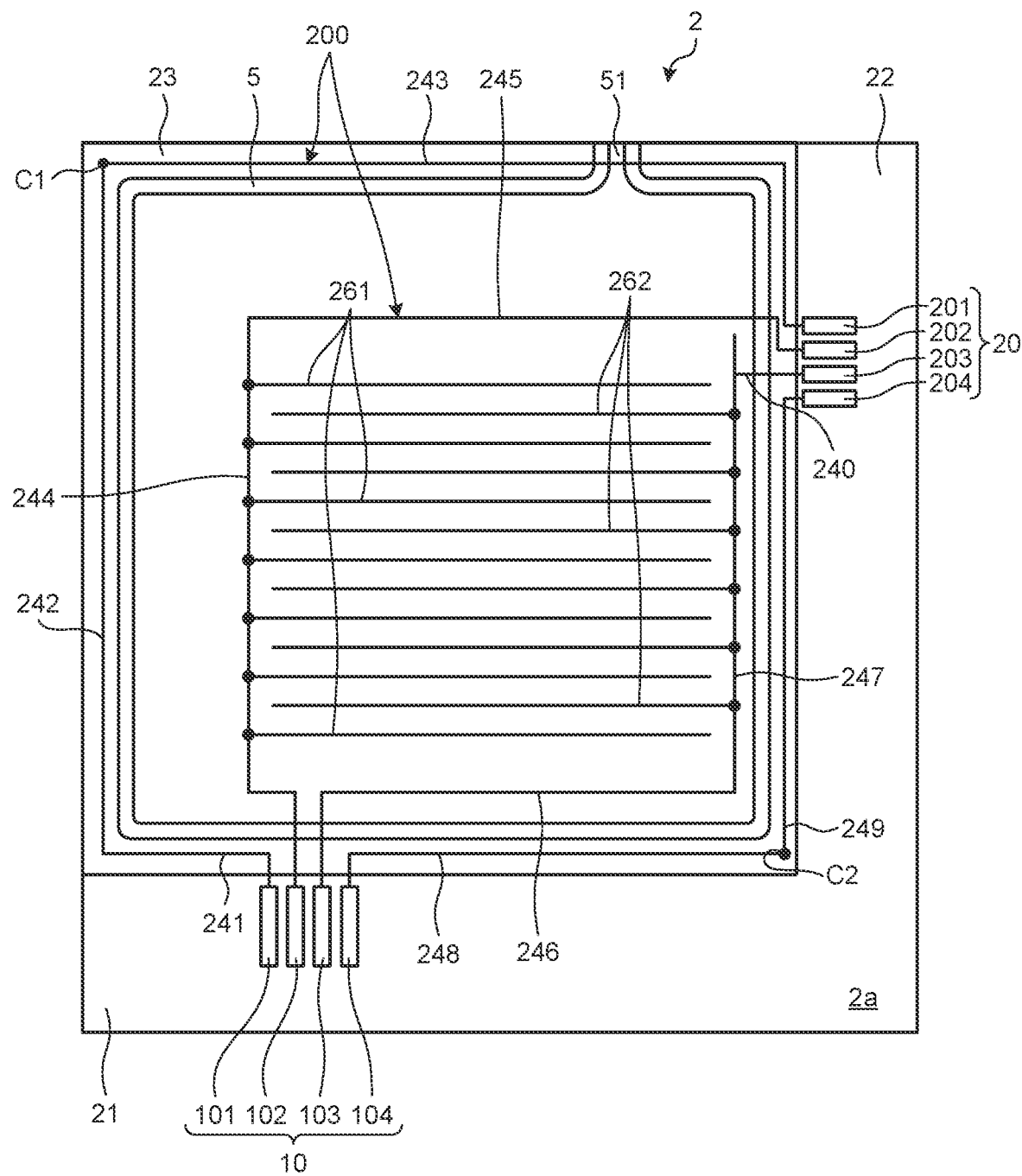
FIG. 2 is a schematic diagram of an array substrate according to the first embodiment when viewed from above.
Figure 2:
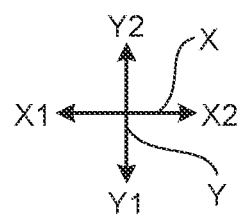
Figure 3:
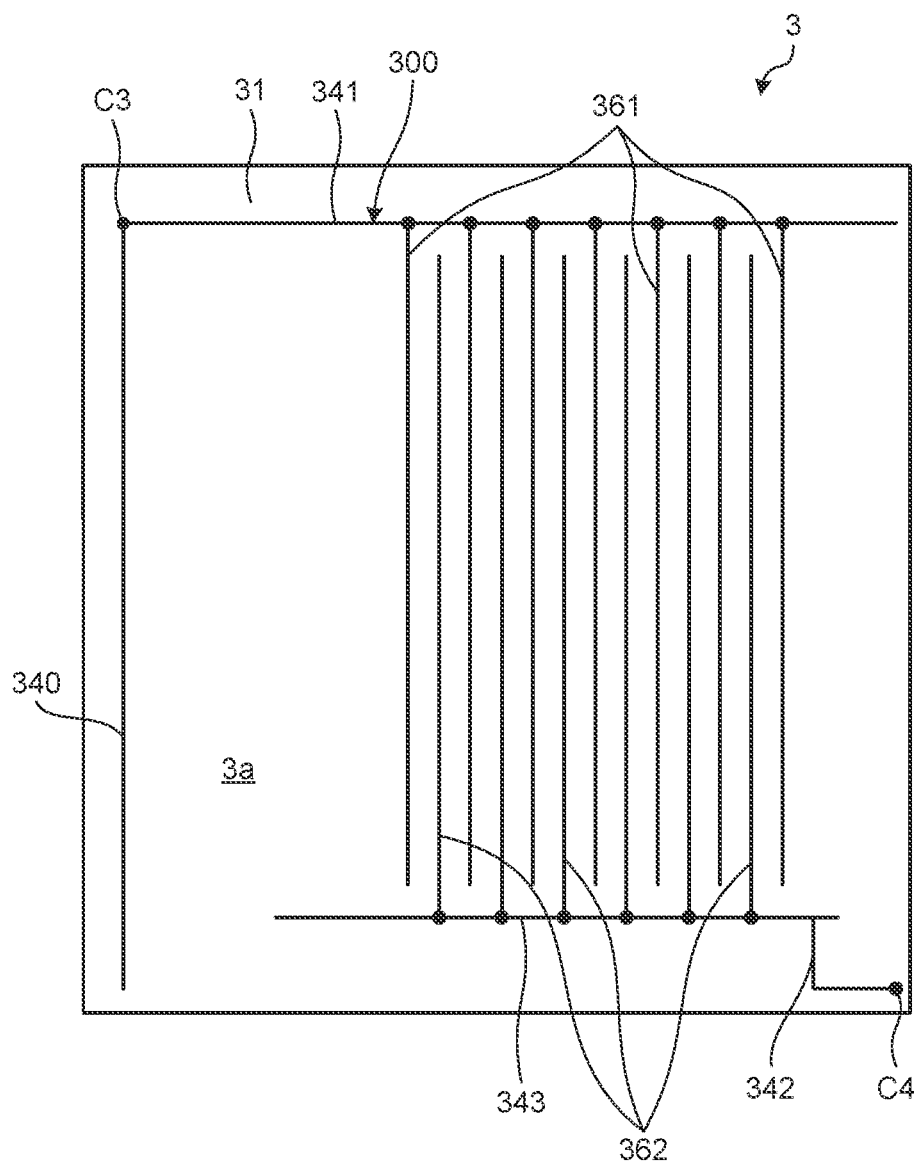
FIG. 3 is a schematic diagram of a counter substrate according to the first embodiment when viewed from above.
Figure 3:
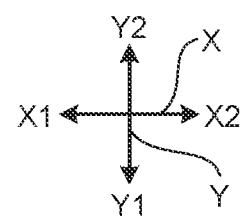
Figure 4:
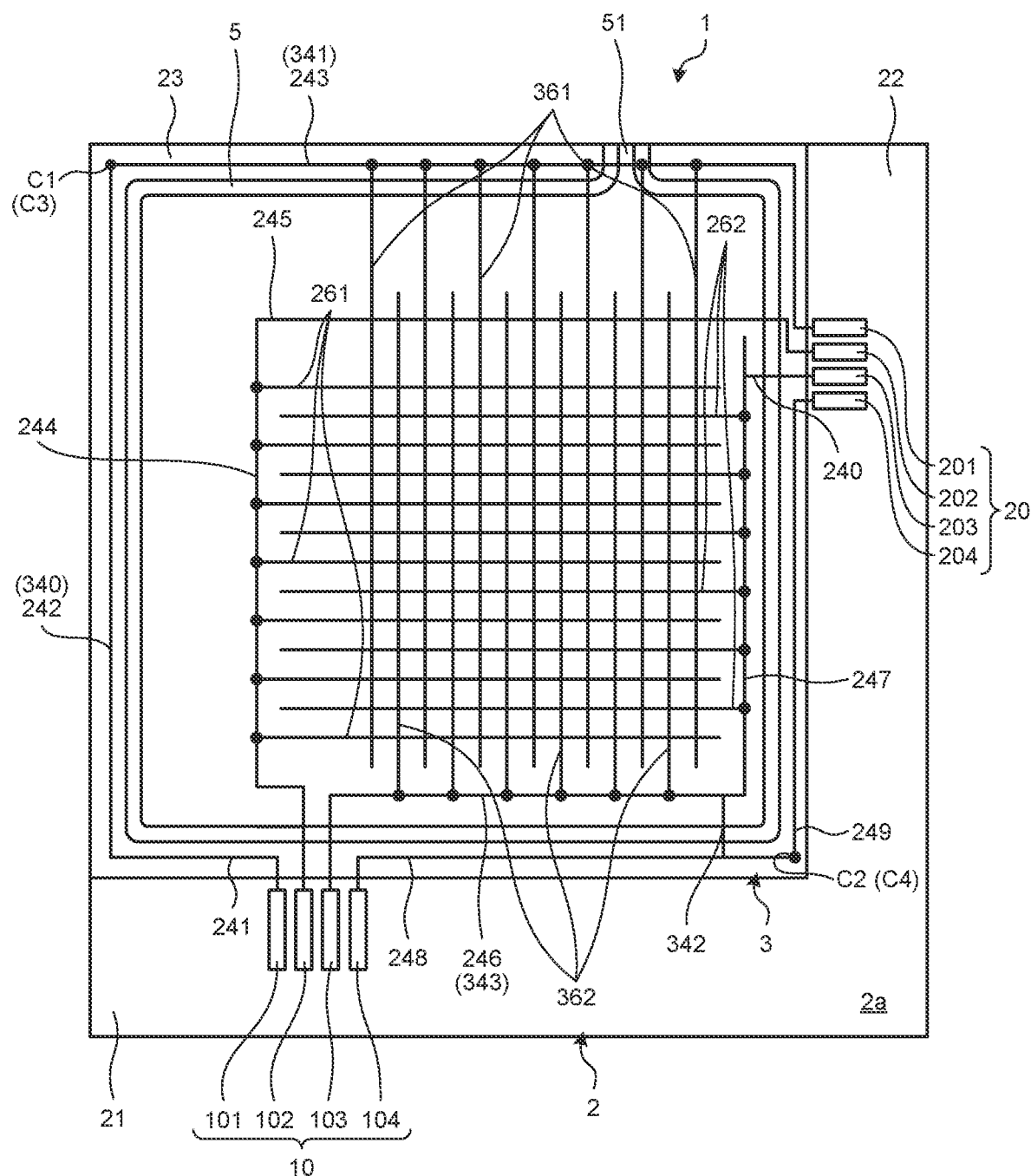
FIG. 4 is a schematic diagram of the light adjustment panel according to the first embodiment when viewed from above.
Figure 4:
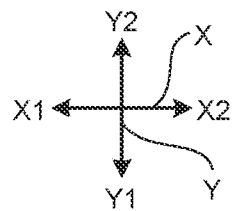
Figure 5:
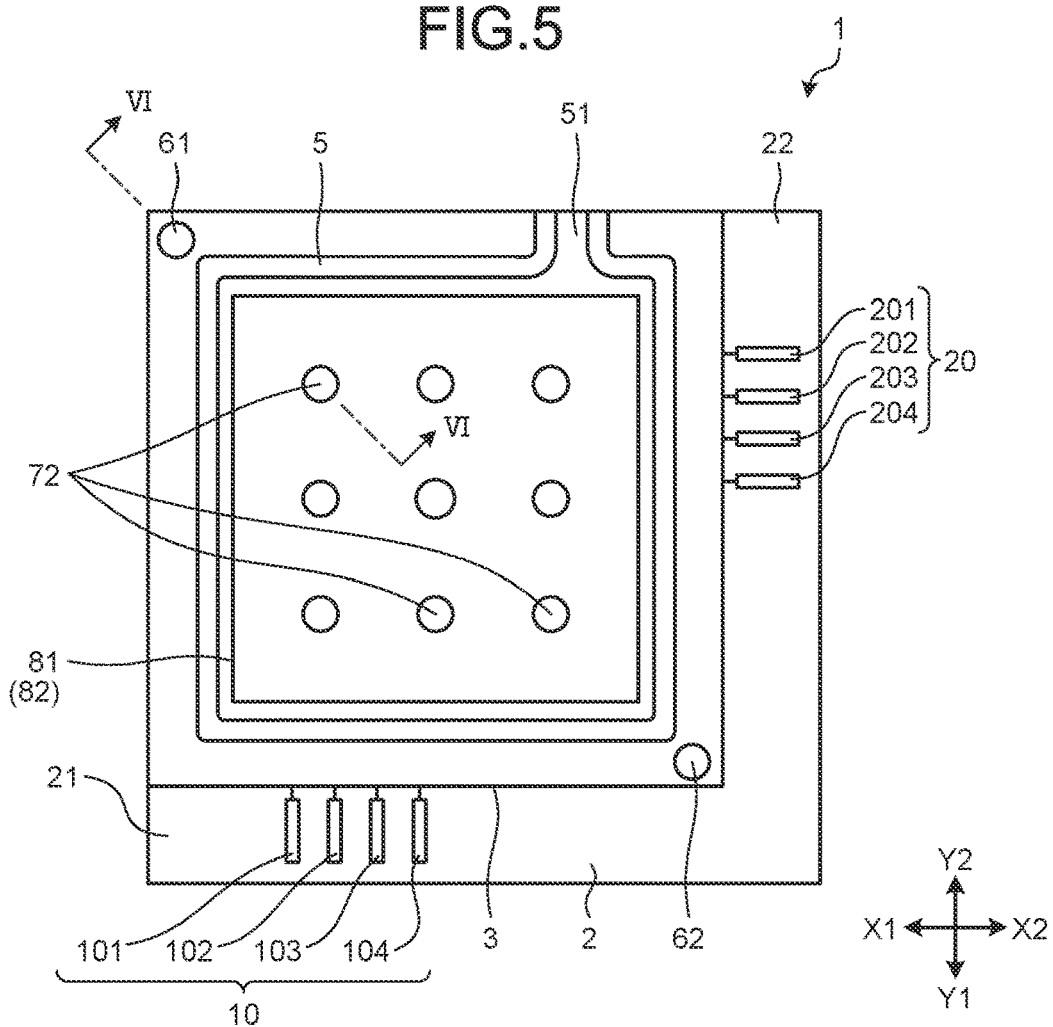
FIG. 5 is a schematic diagram of the light adjustment panel according to the first embodiment when viewed from above.
Figure 6:
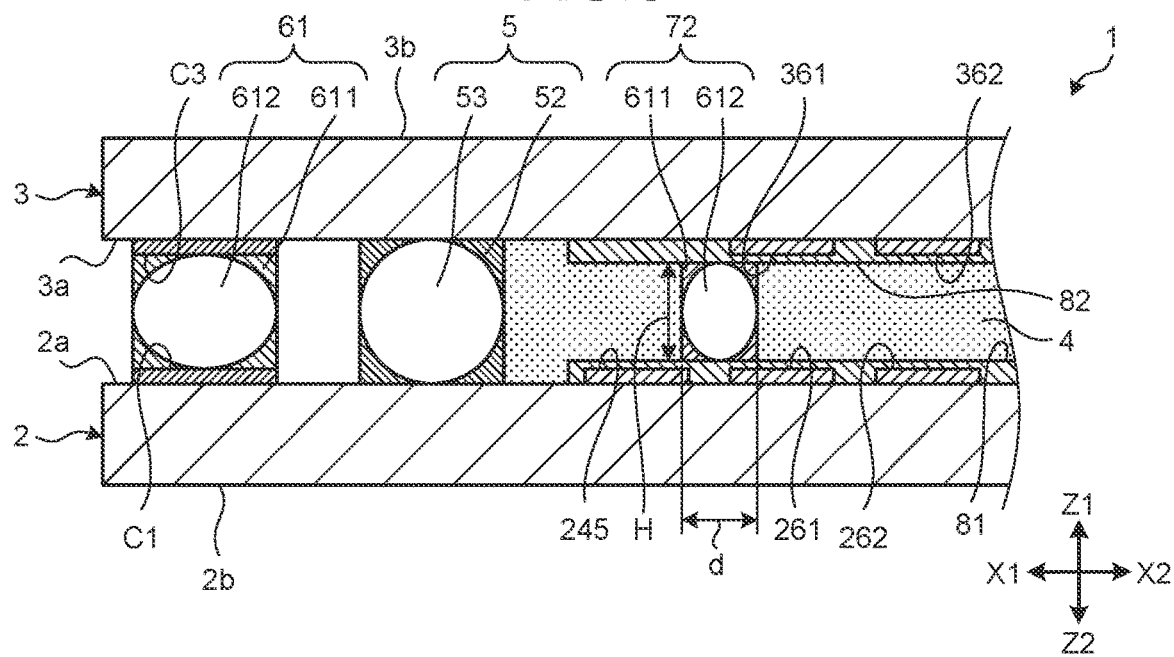
FIG. 6 is a sectional view taken along line VI-VI in FIG. 5.
Figure 7:
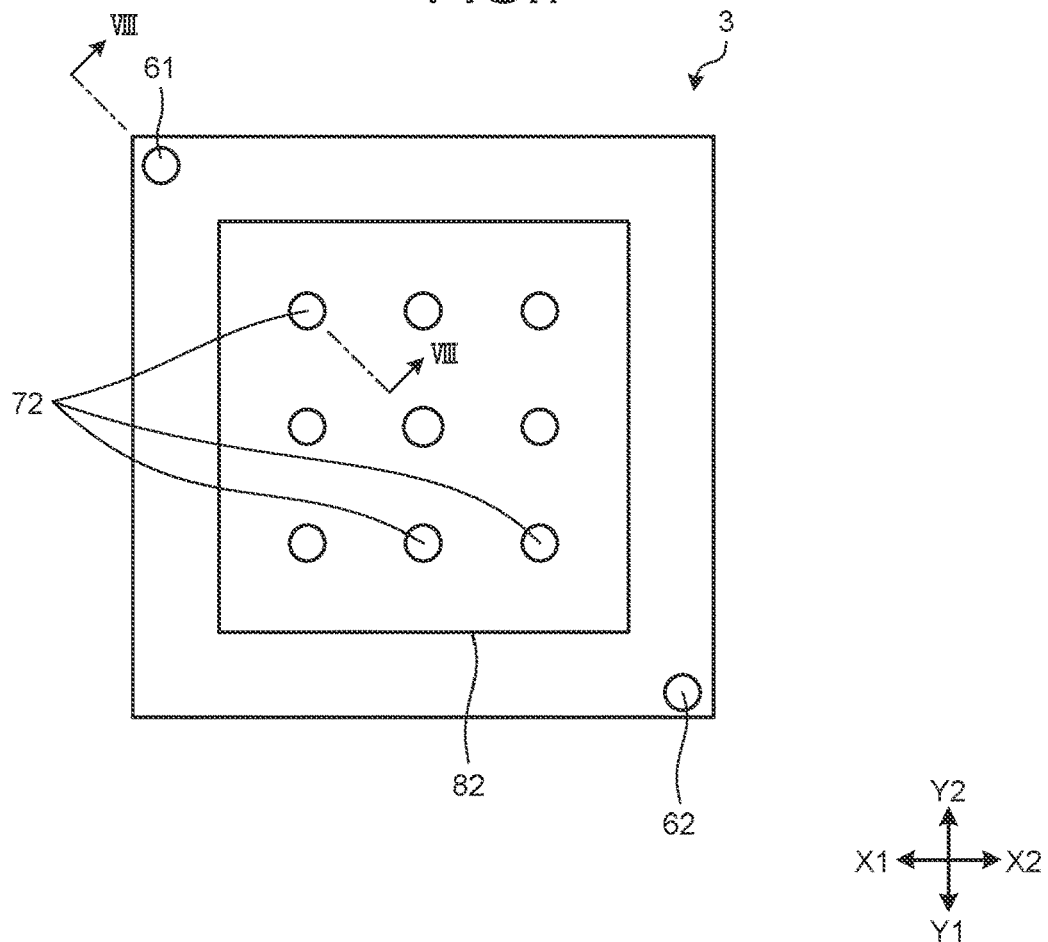
FIG. 7 is a schematic diagram of the counter substrate according to the first embodiment when viewed from above.
Figure 8:
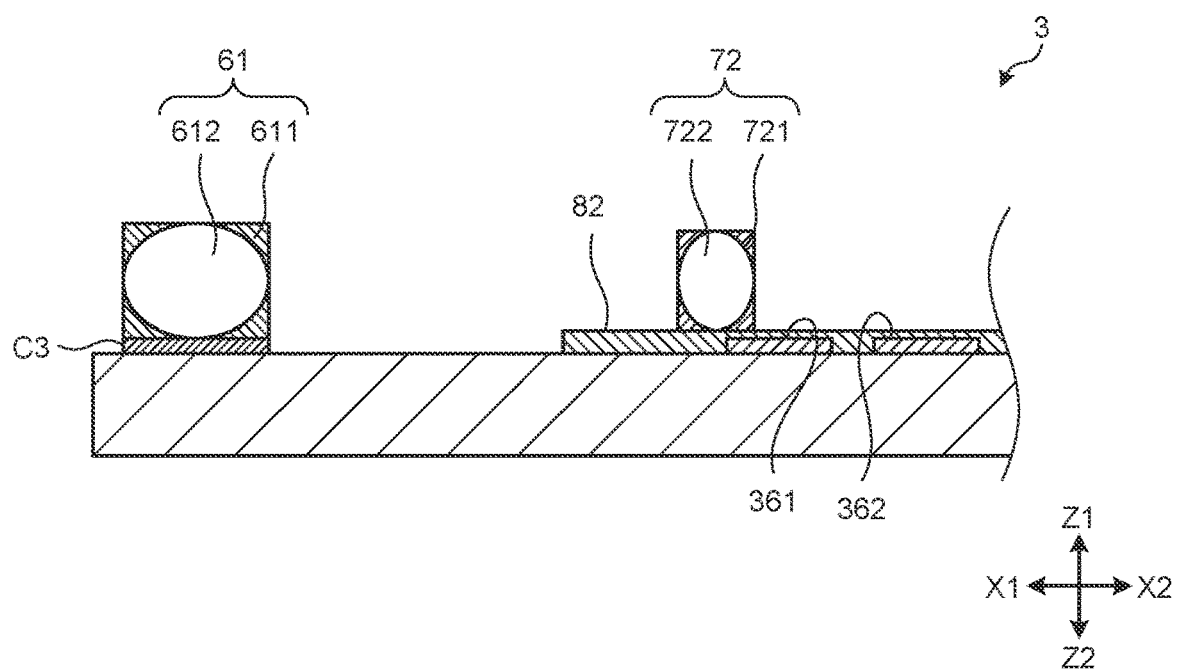
FIG. 8 is a sectional view taken along line VIII-VIII in FIG. 7.
Figure 9:
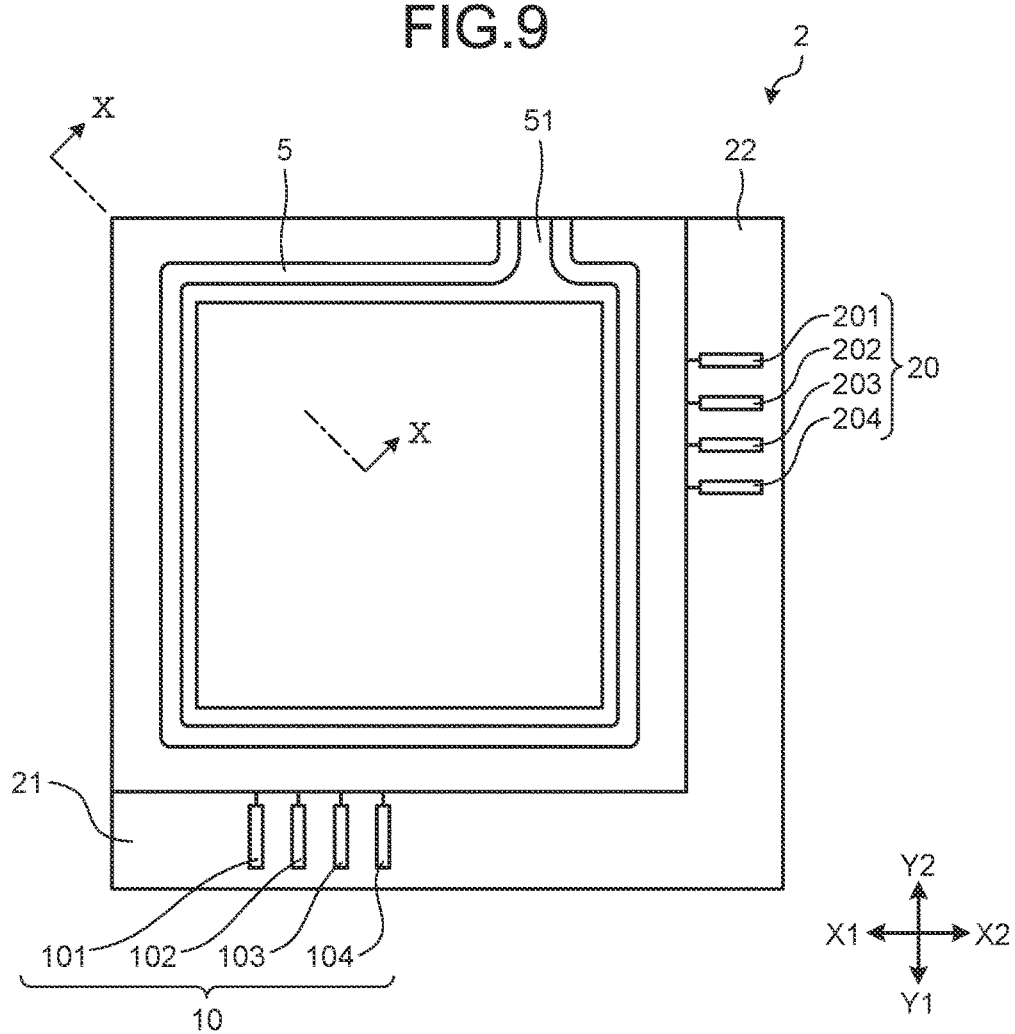
FIG. 9 is a schematic diagram of the array substrate according to the first embodiment when viewed from above.
Figure 10:
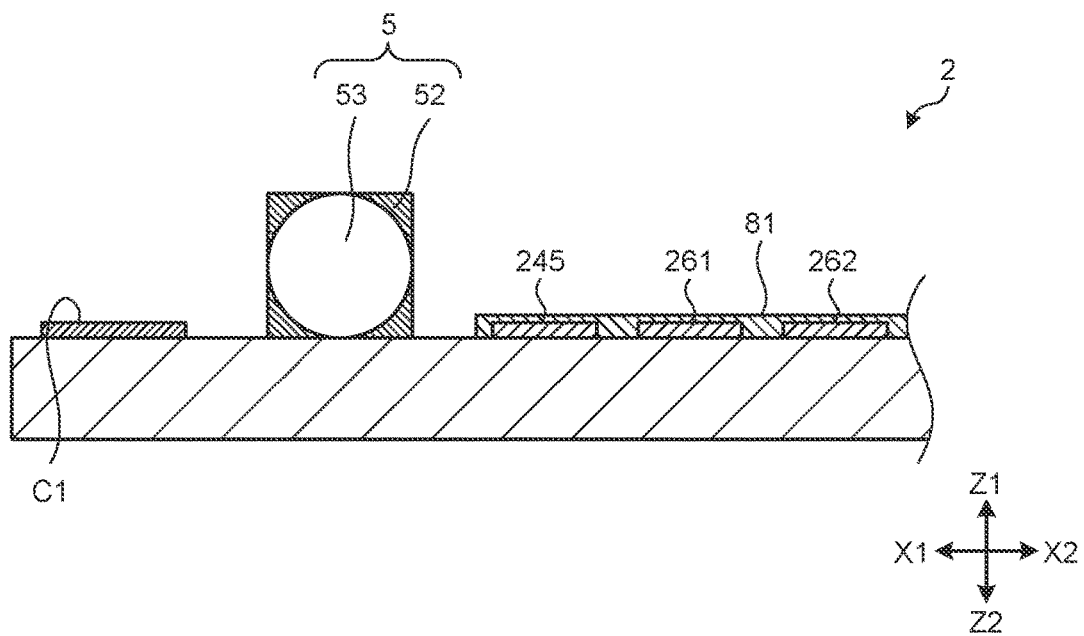
FIG. 10 is a sectional view taken along line X-X in FIG. 9.

First, a light adjustment panel according to a first embodiment will be described below. The light adjustment panel is an exemplary optical element according to the present invention. That is, the optical element of the present invention is not limited to a light adjustment panel but may be, for example, a liquid crystal lens or a liquid crystal antenna. FIG. 1 is a perspective view of the light adjustment panel according to the first embodiment. FIG. 2 is a schematic diagram of an array substrate according to the first embodiment when viewed from above. FIG. 3 is a schematic diagram of a counter substrate according to the first embodiment when viewed from above. FIG. 4 is a schematic diagram of the light adjustment panel according to the first embodiment when viewed from above. FIG. 5 is a schematic diagram of the light adjustment panel according to the first embodiment when viewed from above. FIG. 6 is a sectional view taken along line VI-VI in FIG. 5. FIG. 7 is a schematic diagram of the counter substrate according to the first embodiment when viewed from above. FIG. 8 is a sectional view taken along line VIII-VIII in FIG. 7. FIG. 9 is a schematic diagram of the array substrate according to the first embodiment when viewed from above. FIG. 10 is a sectional view taken along line X-X in FIG. 9.

As illustrated in FIG. 1, a light adjustment panel 1 according to the first embodiment includes an array substrate (first substrate) 2, a counter substrate (second substrate) 3, a liquid crystal layer 4, a sealing member 5, and first spacers 72 to be described later. The counter substrate 3 is disposed on the upper side (Z1 side) of the array substrate 2. The liquid crystal layer 4 is provided between the counter substrate 3 and the array substrate 2. The sealing member 5 extends along the outer periphery of the liquid crystal layer 4. The sealing member 5 includes an inflow port 51 for liquid crystal on the Y2 side. The active region 40 is a region in which the liquid crystal layer 4 is provided, a frame region is a region outside the liquid crystal layer 4, and a first area 21 and a second area 22 are terminal regions. A first terminal group 10 of the array substrate 2 can be electrically coupled to a flexible printed circuit (FPC) 400.

As illustrated in FIGS. 1 and 4, the array substrate 2 is larger than the counter substrate 3. That is, the area of the counter substrate 3 is smaller than the area of the array substrate 2. The array substrate 2 includes a transparent glass 23 (refer to FIG. 2). The counter substrate 3 includes a transparent glass 31 (refer to FIG. 3). In the first embodiment, the array substrate 2 and the counter substrate 3 have square shapes in plan view from above, but the shapes of substrates according to the present invention are not limited to square shapes. In plan view from above, an end of the counter substrate 3 on the X1 side is provided at substantially the same position in the X direction as that of an end of the array substrate 2 on the X1 side, and an end of the counter substrate 3 on the Y2 side is provided at substantially the same position in the Y direction as that of an end of the array substrate 2 on the Y2 side. Consequently, an end part of a front surface 2a of the array substrate 2 on the Y1 side and an end part of the front surface 2a of the array substrate 2 on the X2 side are exposed. The sealing member 5 extends in an annular shape along the outer periphery of the counter substrate 3. The array substrate 2 or the counter substrate 3 may be formed of transparent resin not glass.

In other words, as illustrated in FIGS. 1 and 4, the front surface 2a of the array substrate 2 includes a first area (first side) 21 and a second area (second side) 22, and the first area 21 and the second area 22 are exposed. The first area 21 and the second area 22 are orthogonal to (intersect) each other. The first area 21 is positioned at the end part of the front surface 2a of the array substrate 2 on the Y1 side and extends in the X direction. The second area 22 is positioned at the end part of the front surface 2a of the array substrate 2 on the X2 side and extends in the Y direction. The first area 21 and the second area 22 form an L shape when viewed from above. The first terminal group 10 is disposed on the first area 21, and a second terminal group 20 is disposed on the second area 22. The first terminal group 10 and the second terminal group 20 are exposed since the area of the counter substrate 3 is smaller than that of the array substrate 2 in the light adjustment panel 1.

As illustrated in FIGS. 2 and 4, the first terminal group 10 includes a first terminal 101, a second terminal 102, a third terminal 103, and a fourth terminal 104. The first terminal 101, the second terminal 102, the third terminal 103, and the fourth terminal 104 are sequentially arranged from the X1 side toward the X2 side in the right-left direction (X direction).

As illustrated in FIGS. 2 and 4, the second terminal group 20 includes a fifth terminal 201, a sixth terminal 202, a seventh terminal 203, and an eighth terminal 204. The fifth terminal 201, the sixth terminal 202, the seventh terminal 203, and the eighth terminal 204 are sequentially arranged from the Y2 side toward the Y1 side in the front-back direction (Y direction).

The following describes wiring lines of the array substrate 2 and the counter substrate 3. As illustrated in FIG. 6, wiring lines are provided on the front surface of each substrate, among the front and back surfaces thereof. In other words, a surface on which wiring lines are provided is referred to as the front surface, and a surface opposite to the front surface is referred to as the back surface. Specifically, as illustrated in FIG. 6, wiring lines are provided on the front surface 2a on the upper side among the front surface 2a and a back surface 2b of the array substrate 2, and wiring lines are provided on a front surface 3a on the lower side among the front surface 3a and a back surface 3b of the counter substrate 3. In this manner, the array substrate 2 and the counter substrate 3 are disposed so that the front surface 2a and the front surface 3a are opposite to each other with the liquid crystal layer 4 interposed therebetween. The wiring lines of the array substrate 2 and the counter substrate 3 are supplied with, for example, alternating current (AC) with a pulse wave form having a predetermined amplitude and a predetermined period (for example, ±15 V) from a power source, which is not illustrated. Detailed description thereof will be given below.

As illustrated in FIG. 2, a first electrode 200 including wiring lines, liquid crystal drive electrodes, and coupling portions is provided on the front surface 2a of the transparent glass 23 of the array substrate 2. In other words, the array substrate 2 includes the first electrode 200. A coupling portion C1 (refer to FIG. 2) as the first electrode 200 of the array substrate 2 and a coupling portion C3 (refer to FIG. 3) as a second electrode 300 of the counter substrate 3 are electrically coupled to each other through a conductive column 61 (refer to FIGS. 5 and 6) capable of conducting electricity. Similarly, a coupling portion C2 (refer to FIG. 2) as the first electrode 200 of the array substrate 2 and a coupling portion C4 (refer to FIG. 3) as the second electrode 300 of the counter substrate 3 are electrically coupled to each other through a conductive column 62 (refer to FIG. 5) capable of conducting electricity.

As illustrated in FIG. 2, the first terminal 101 and the fifth terminal 201 are electrically coupled to each other through wiring lines (first wiring lines) 241, 242, and 243. The wiring line 241 extends in the X1 direction from the first terminal 101. The wiring line 242 extends straight in the Y2 direction from an end of the wiring line 241 to the coupling portion C1. The wiring line 243 extends in the X2 direction from the coupling portion C1 and is coupled to the fifth terminal 201. The wiring lines 241, 242, and 243 are disposed on the outer side of the sealing member 5. A configuration can be employed in which one, some, or all of the wiring lines 241, 242, and 243 are disposed on the inner side of the sealing member 5.

The second terminal 102 and the sixth terminal 202 are electrically coupled to each other through wiring lines (second wiring lines) 244 and 245. The wiring line 244 is coupled to the second terminal 102 and extends in the Y2 direction. The wiring line 245 extends in the X2 direction from an end of the wiring line 244 located in the Y2 direction and is coupled to the sixth terminal 202. The wiring lines 244 and 245 are disposed on the inner side of the sealing member 5. A configuration can be employed in which one or both of the wiring lines 244 and 245 are disposed on the outer side of the sealing member 5.

The third terminal 103 and the seventh terminal 203 are electrically coupled to each other through wiring lines (third wiring lines) 246, 247, and 240. The wiring line 246 is coupled to the third terminal 103 and extends in the X2 direction. The wiring line 247 extends in the Y2 direction from an end of the wiring line 246 located in the X2 direction and is coupled to the wiring line 240. The wiring line 240 is coupled to the seventh terminal 203. The wiring lines 246 and 247 are disposed on the inner side of the sealing member 5. A configuration can be employed in which one, some, or all of the wiring lines 246, 247, and 240 are disposed on the outer side of the sealing member 5.

The fourth terminal 104 and the eighth terminal 204 are electrically coupled to each other through wiring lines (fourth wiring lines) 248 and 249. The wiring line 248 extends straight from the fourth terminal 104 to the coupling portion C2. The wiring line 249 extends straight in the Y2 direction from the coupling portion C2 and is coupled to the eighth terminal 204. The wiring lines 248 and 249 are disposed on the outer side of the sealing member 5. A configuration can be employed in which one or both of the wiring lines 248 and 249 are disposed on the inner side of the sealing member 5.

Liquid crystal drive electrodes 261 are coupled to the wiring line 244. As illustrated in FIG. 2, seven liquid crystal drive electrodes 261 are provided in the present embodiment. Specifically, the seven liquid crystal drive electrodes 261 extend straight in the X2 direction from the wiring line 244. The seven liquid crystal drive electrodes 261 are disposed at equal intervals along the Y direction.

Liquid crystal drive electrodes 262 are coupled to the wiring line 247. As illustrated in FIG. 2, six liquid crystal drive electrodes 262 are provided in the present embodiment. Specifically, the six liquid crystal drive electrodes 262 extend straight in the X1 direction from the wiring line 247. The six liquid crystal drive electrodes 262 are disposed at equal intervals in the Y direction. The liquid crystal drive electrodes 261 and 262 are alternately arranged in the Y direction.

As illustrated in FIG. 3, the second electrode 300 including wiring lines 340, 341, 342, and 343, liquid crystal drive electrodes 361 and 362, and the coupling portions C3 and C4 is provided on the front surface 3a of the counter substrate 3. In other words, the counter substrate 3 includes the second electrode 300.

The wiring line 340 extends straight in the Y1 direction from the coupling portion C3. The wiring line 341 extends straight in the X2 direction from the coupling portion C3.

The wiring line 342 is coupled to the coupling portion C4. The wiring line 343 is coupled to the wiring line 342 and extends straight in the X1 direction.

The liquid crystal drive electrodes 361 are coupled to the wiring line 341. As illustrated in FIG. 3, seven liquid crystal drive electrodes 361 are provided in the present embodiment. Specifically, the seven liquid crystal drive electrodes 361 extend straight in the Y1 direction from the wiring line 341. The seven liquid crystal drive electrodes 361 are disposed at equal intervals along the X direction.

The liquid crystal drive electrodes 362 are coupled to the wiring line 343. As illustrated in FIG. 3, six liquid crystal drive electrodes 362 are provided in the present embodiment. Specifically, the six liquid crystal drive electrodes 362 extend straight in the Y2 direction from the wiring line 343. The six liquid crystal drive electrodes 362 are disposed at equal intervals along the X direction. The liquid crystal drive electrodes 361 and 362 are alternately arranged in the X direction.

The following describes the light adjustment panel 1, particularly focusing on the conductive columns 61 and 62 and the first spacers (spacer) 72. In the first embodiment, the conductive columns 61 and 62 and the first spacers 72 include the same conductive material.

As illustrated in FIG. 5, the sealing member 5 is provided in an annular shape in the light adjustment panel 1. The sealing member 5 has a substantially rectangular shape in plan view. The two conductive columns 61 and 62 are disposed on the outer side of the sealing member 5. The conductive column 61 is disposed at an end part of the counter substrate 3 (light adjustment panel 1) on the Y2 side and the X1 side. The conductive column 62 is disposed at an end part of the counter substrate 3 on the Y1 side and the X2 side.

As illustrated in FIGS. 5 and 6, insulating layers 81 and 82 and the first spacers 72 are provided on the inner side of the sealing member 5. The insulating layers 81 and 82 have rectangular shapes in plan view. The insulating layer 81 is provided to the array substrate 2, and the insulating layer 82 is provided to the counter substrate 3. The insulating layers 81 and 82 overlap with each other when viewed from above. The first spacers 72 each have a column shape. A plurality of the first spacers 72 are scattered at equal intervals. Specifically, in the first embodiment, nine first spacers 72 are provided in total and disposed at equal intervals. Specifically, three of the nine first spacers 72 are disposed on a first line closest to the Y2 side, another three are disposed on a second line adjacent to the first line located on the Y1 side of the first line, and the other three are disposed on a third line adjacent to the second line located on the Y1 side of the second line. The three first spacers 72 on the first line are disposed at equal intervals in the X direction, the three first spacers 72 on the second line are disposed at equal intervals in the X direction, and the three first spacers 72 on the third line are disposed at equal intervals in the X direction.

A configuration in which the first spacer 72 has a column shape means that the height H of the first spacer 72 is greater than the maximum width d of the first spacer 72 when viewed in plan view (d<H) as illustrated in FIG. 6 or the height H is equal to the width d (d=H). In the former case, d≤H/2 is preferably satisfied. Furthermore preferably, d≤H/3 is satisfied. Most preferably, d≤H/5 is satisfied. Similarly, a configuration in which the second spacer 71 has a column shape means that the height of the second spacer 71 is greater than or equal to the maximum width of the second spacer 71 when viewed in plan view.

The planar shape of the first spacer 71 when viewed in plan view is not limited to a circular shape or an oval shape and can be a polygonal shape or a polygon-like shape such as a square shape and a rectangular shape having rounded corners.

As illustrated in FIG. 6, the conductive column 61 electrically connects the coupling portion (first electrode 200) C1 of the array substrate 2 to the coupling portion (second electrode 300) C3 of the counter substrate 3. In other words, the conductive column 61 is provided between the coupling portion (first electrode 200) C1 and the coupling portion (second electrode 300) C3. The conductive column 61 is made of a conductive material. Specifically, the conductive column 61 includes a resin 611 and a conductive bead 612 contained in the resin 611. The conductive bead 612 contacts both the coupling portion (first electrode 200) C1 and the coupling portion (second electrode 300) C3. The resin 611 may be, for example, an ultraviolet (UV) curable resin or a thermosetting resin. The UV curable resin is a synthesis resin that chemically changes from liquid to solid through reaction with ultraviolet light energy. The diameter of the conductive bead 612 is preferably, for example, in a range of 10 micrometers to 100 micrometers inclusive, and the thicknesses of the first electrode 200 and the second electrode 300 are preferably, for example, in a range of 30 nanometers to 250 nanometers inclusive. A cell gap as the distance between the front surface 2a of the array substrate 2 and the front surface 3a of the counter substrate 3 illustrated in FIG. 6 is preferably, for example, in a range of 10 micrometers to 150 micrometers inclusive, more preferably, in a range of 20 micrometers to 100 micrometers inclusive. Furthermore, the cell gap can be in a range of 30 micrometers to 80 micrometers inclusive. A cell gap of a liquid crystal cell used for a conventional liquid crystal display device is in a range of 3 micrometers to 5 micrometers inclusive. Thus, the cell gap of the light adjustment panel 1 of the present embodiment is considerably greater than that of such a conventional liquid crystal display device.

As illustrated in FIG. 6, each first spacer 72 is provided between the insulating layer 81 of the array substrate 2 and the insulating layer 82 of the counter substrate 3. In the sectional view of FIG. 6, the insulating layer 81 is provided on the second wiring line 245 and the liquid crystal drive electrodes 261 and 262. In addition, the insulating layer 82 is provided on the liquid crystal drive electrodes 361 and 362. The insulating layers 81 and 82 are made of a transparent inorganic insulating material such as silicon nitride. Each first spacer 72 includes the resin 611 and the conductive bead 612 contained in the resin 611. In this manner, each first spacer 72 is made of the same material as that of the conductive column 61. The first spacer 72 overlaps with the first electrode 200 of the array substrate 2 and the second electrode 300 of the counter substrate 3 with the insulating layers 81 and 82 interposed therebetween. In the present disclosure, the first spacer 72 may overlap with the first electrode 200 of the array substrate 2 with the insulating layer 81 interposed therebetween, or may overlap with the second electrode 300 of the counter substrate 3 with the insulating layer 82 interposed therebetween. In other words, the first spacer 72 overlaps with at least one of the first electrode 200 of the array substrate 2 and the second electrode 300 of the counter substrate 3 with at least one of the insulating layers 81, 82 interposed therebetween. With this configuration, although the first spacers 72 are conductive, insulation between the first electrode 200 of the array substrate 2 and the second electrode 300 of the counter substrate 3 is maintained by the insulating layers 81 and 82.

Although not illustrated in the figure, a configuration can be employed in which an alignment film is provided on each of the insulating layers 81 and 82 to control the initial orientation of the liquid crystal of the liquid crystal layer 4.

The sealing member 5 is made of an insulating material. Specifically, as illustrated in FIG. 6, the sealing member 5 includes an insulating resin 52 and the insulating bead 53 contained in the resin 52. The insulating bead 53 may be, for example, a resin bead or a silica bead.

The following briefly describes a method of manufacturing the light adjustment panel 1 according to the first embodiment with reference to FIGS. 5 to 10.

First, as illustrated in FIGS. 7 and 8, the conductive columns 61 and 62, the insulating layer 82, and the first spacers 72 are formed on the counter substrate 3. In this case, a plurality of counter substrates 3 that are continuous in the right-left direction can be formed by using, for example, one glass substrate that is long in the right-left direction.

Specifically, the insulating layer 82 is first formed on the counter substrate 3 on which the wiring lines are patterned. The insulating layer 82 having a rectangular shape is provided at a central part of the counter substrate 3 by using a transparent inorganic insulating material such as silicon nitride as described above. Thereafter, the conductive columns 61 and 62 and the first spacers 72 are provided. The conductive columns 61 and 62 and the first spacers 72 are formed of the same material as described above. In the present embodiment, for example, mixture of the conductive bead 612 with the resin 611 such as a UV curable resin is applied in point shapes. Since the nine first spacers 72 are provided, the mixture is applied at equal intervals as nine dots on the insulating layer 82.

Subsequently, as illustrated in FIGS. 9 and 10, the insulating layer 81 and the sealing member 5 are formed on the array substrate 2. In this case, a plurality of array substrates 2 that are continuous in the right-left direction can be formed by using, for example, one glass substrate that is long in the right-left direction. Specifically, the insulating layer 81 having a rectangular shape is provided on the array substrate 2 by using a transparent inorganic insulating material such as silicon nitride. In addition, the sealing member 5 obtained by mixing the insulating bead 53 in the resin 52 is applied along the outer periphery of the insulating layer 81 through a dispenser. The sealing member 5 may be formed by printing.

Then, after the counter substrate 3 and the array substrate 2 are bonded to each other, the conductive columns 61 and 62, the first spacers 72, and the sealing member 5 are cured by applying light (ultraviolet light) and/or heat thereto. Specifically, the two above-described glass substrates that are long in the right-left direction are boded to each other. Thereafter, the bonded glass substrates are cut into sets of the counter substrate 3 and the array substrate 2. Then, after liquid crystal is injected to the inner side of the sealing member 5 through the inflow port 51 of the sealing member 5, the inflow port 51 is sealed with a sealant (not illustrated), thereby bringing the light adjustment panel 1 to completion.

As described above, the light adjustment panel 1 according to the first embodiment includes: the array substrate 2 including the coupling portions C1 and C2 (first electrode 200); the counter substrate 3 including the coupling portions C3 and C4 (second electrode 300); the liquid crystal layer 4 provided between the array substrate 2 and the counter substrate 3; the sealing member 5 extending along the outer periphery of the liquid crystal layer 4; the first spacers 72 provided on the inner side of the sealing member 5; the conductive column 61 provided on the outer side of the sealing member 5 and electrically connecting the coupling portion C1 and the coupling portion C3; and the conductive column 62 provided on the outer side of the sealing member 5 and electrically connecting the coupling portion C2 and the coupling portion C4. The conductive columns 61 and 62 and the first spacers 72 include the same material.

With this configuration, the conductive columns 61 and 62 and the first spacers 72 can be formed of the same material with the same equipment (for example, a robot). Thus, work of forming the first spacers 72 can be further simplified.

The material of the conductive columns 61 and 62 and the first spacers 72 includes the resin 611 and the conductive beads 612 contained in the resin 611.

Since each first spacer 72 includes the conductive bead 612, it is possible, by using a plurality of conductive beads 612 having the same diameter, to easily keep equal the cell gap at each area in plan view. An insulating layer is preferably provided to prevent short-circuit between the first electrode 200 of the array substrate 2 and the second electrode 300 of the counter substrate 3.

Each first spacer 72 has a column shape. Therefore, the area of a region where the first spacer 72 supports the array substrate 2 and the counter substrate 3 is larger than that in a case in which the first spacer 72 is, for example, a sphere, and thus the counter substrate 3 can be more stably supported.

A plurality of the first spacers 72 are scattered at equal intervals. Therefore, force for supporting the counter substrate 3 on the upper side is more equally applied on the first spacers 72 than that in a case in which the first spacers 72 are disposed at non-equal intervals, and thus the thickness of the liquid crystal layer 4 is more uniform.

As described above, the cell gap of the light adjustment panel 1 according to the present embodiment is considerably greater than that of a cell gap for a conventional display device. Therefore, spacers are required to have strength enough to maintain the cell gap. According to the present embodiment, the first spacer 72 is formed so as to include the conductive bead 612, and the conductive bead 612 has sufficient compressive strength. Consequently, the first spacer 72 has sufficient supporting strength. Needless to say, the conductive bead 612 functions as what is called a support column in each first spacer 72 and contributes to keeping the shape and the attitude of the first spacer 72 that stands erect without any support from other elements in an effective area. In the first spacer 72, the resin 611 is provided around the conductive bead 612, and the first spacer 72 is formed on the insulating layers 81 and 82, which function as buffer materials to reduce occurrence of damage or the like to the first spacer 72 that would be caused by the first spacer 72 coming in direct contact with electrodes and/or substrates.

The array substrate 2 has a rectangular shape including the first area 21 and the second area 22. The first terminal group 10 is disposed in the first area 21, and the second terminal group 20 is disposed in the second area 22. The area of the array substrate 2 is larger than that of the counter substrate 3. Thus, the first terminal group 10 and the second terminal group 20 are exposed when the counter substrate 3 is stacked on the array substrate 2.

The first terminal group 10 includes the first terminal 101, the second terminal 102, the third terminal 103, and the fourth terminal 104. The second terminal group 20 includes the fifth terminal 201, the sixth terminal 202, the seventh terminal 203, and the eighth terminal 204. The first terminal 101 and the fifth terminal 201 are electrically coupled to each other through the first wiring line, the second terminal 102 and the sixth terminal 202 are electrically coupled to each other through the second wiring line, the third terminal 103 and the seventh terminal 203 are electrically coupled to each other through the third wiring line, the fourth terminal 104 and the eighth terminal 204 are electrically coupled to each other through the fourth wiring line, and the liquid crystal drive electrodes 261 are coupled to the second wiring line and the liquid crystal drive electrodes 262 are coupled to the third wiring line.

With this configuration, the first terminal group 10 or the second terminal group 20 can be disposed on the same side (for example, the Y1 side in FIG. 4) by rotating the orientation of the light adjustment panel 1 by, for example, 90 degrees. Thus, when the flexible printed circuit 400 is coupled to the first terminal group 10 or the second terminal group 20, the flexible printed circuit 400 can be led out from the same side.

Second Embodiment

Figure 11:
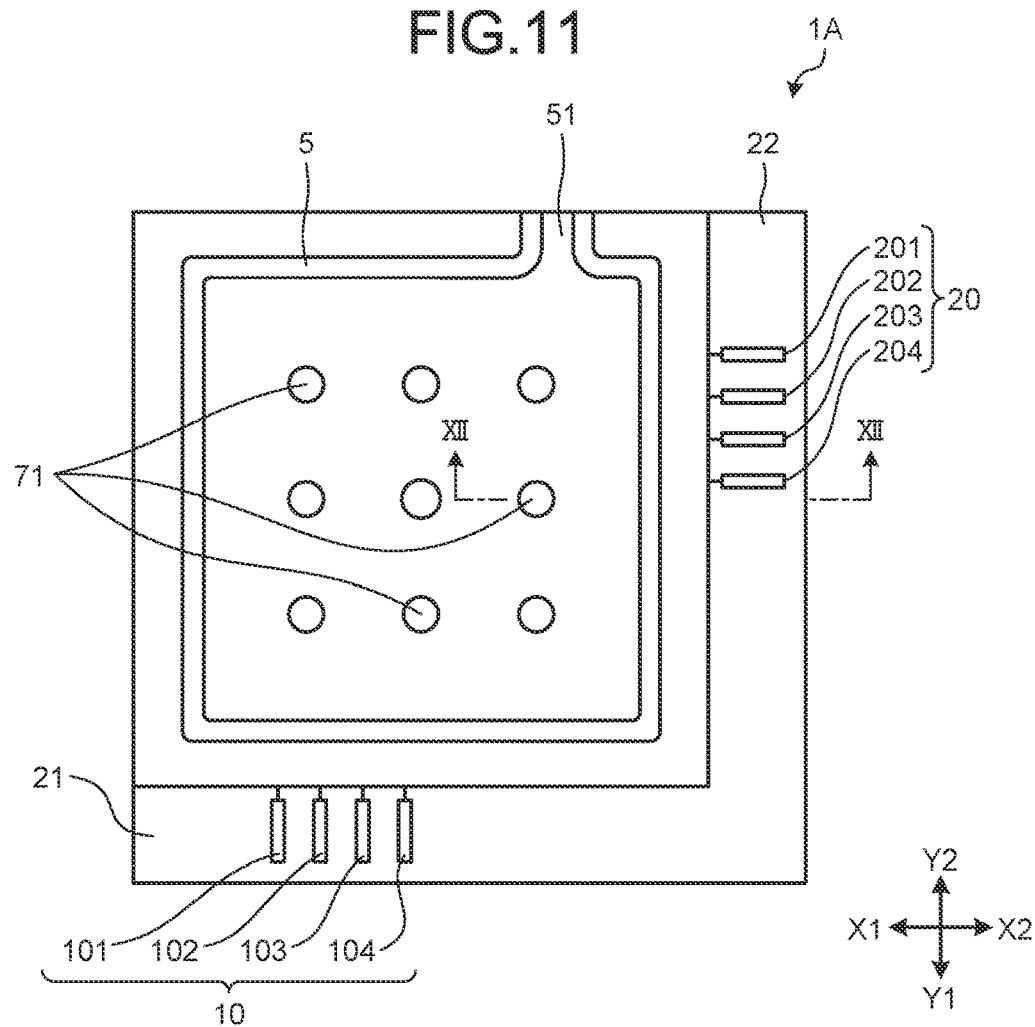
FIG. 11 is a schematic diagram of a light adjustment panel according to a second embodiment when viewed from above.
Figure 12:
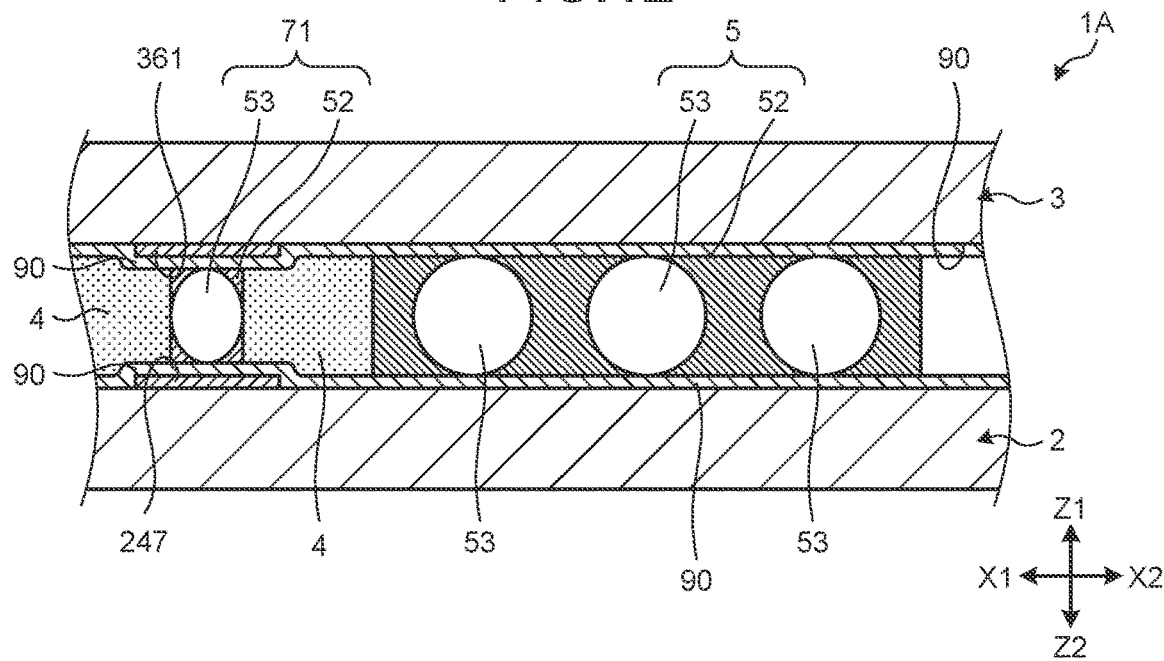
FIG. 12 is a sectional view taken along line XII-XII in FIG. 11.
Figure 13:
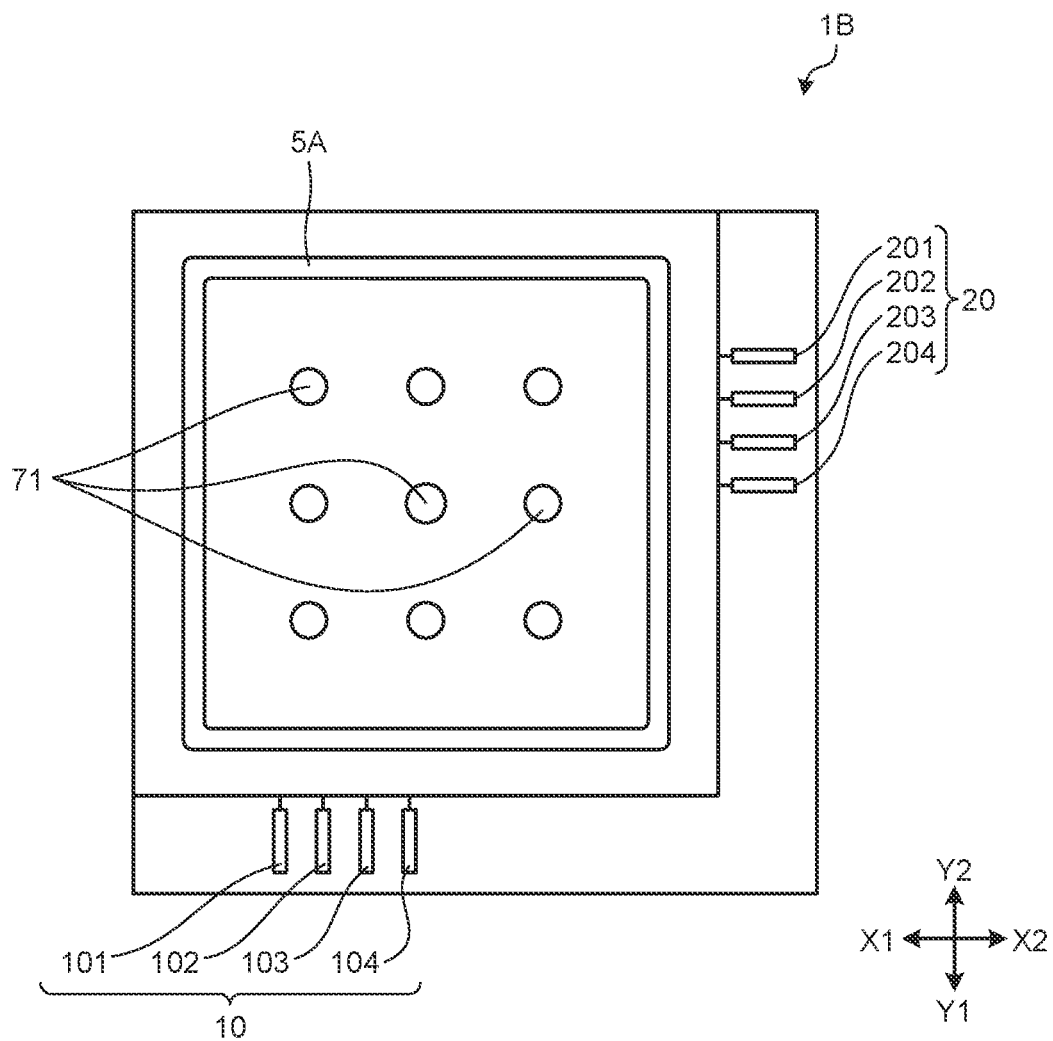
FIG. 13 is a schematic diagram of a light adjustment panel according to a modification when viewed from above.

The following describes a light adjustment panel according to a second embodiment. FIG. 11 is a schematic diagram of the light adjustment panel according to the second embodiment when viewed from above. FIG. 12 is a sectional view taken along line XII-XII in FIG. 11. FIG. 13 is a schematic diagram of a light adjustment panel according to a modification when viewed from above. In the second embodiment, a sealing member and second spacers include the same material. Detailed description thereof will be given below.

As illustrated in FIGS. 11 and 12, a light adjustment panel 1A according to the second embodiment includes the array substrate (first substrate) 2, the counter substrate (second substrate) 3, the liquid crystal layer 4, the sealing member 5, and second spacers 71. The counter substrate 3 is disposed on the upper side (Z1 side) of the array substrate 2. The liquid crystal layer 4 is provided between the counter substrate 3 and the array substrate 2. The sealing member 5 extends along the outer periphery of the liquid crystal layer 4. A plurality (nine) of the second spacers 71 are scattered at equal intervals.

As illustrated in FIG. 12, the sealing member 5 includes the resin 52, which is formed of epoxy resin or acrylic resin, and the insulating beads 53 contained in the resin 52. The insulating bead 53 may be, for example, a resin bead or a silica bead. In FIG. 12, three insulating beads 53 are arranged in the X direction, but the number of insulating beads 53 is not particularly limited. An embodiment can be employed in which the material forming the sealing member 5 can be formed of a material having a light-transmitting property.

As illustrated in FIG. 12, an alignment film 90 is provided in the entire region of the liquid crystal layer 4. Specifically, as illustrated in FIG. 12, at parts corresponding to electrodes, the alignment film 90 is disposed on, for example, the third wiring line 247 (refer to FIG. 2) for the array substrate 2 and on the liquid crystal drive electrode 361 (refer to FIG. 3) for the counter substrate 3, whereas at parts not corresponding to electrodes, the alignment film 90 is disposed on the front surface 2a of the array substrate 2 and the front surface 3a of the counter substrate 3. The second spacer 71 is provided between the third wiring line 247 and the liquid crystal drive electrodes 361. The second spacer 71 has a column shape. In the same way as the sealing member 5, the second spacer 71 includes the insulating resin 52 and the insulating bead 53 contained in the resin 52. The insulating bead 53 may be, for example, a resin bead or a silica bead. The thickness of the alignment film 90 is preferably, for example, in a range of 30 nanometers to 100 nanometers inclusive. In the second embodiment as well, the cell gap is preferably, for example, in a range of 20 micrometers to 100 micrometers inclusive.

The sealing member is not limited to the sealing member 5 including the inflow port 51 for liquid crystal as described above but may be a sealing member 5A having an annular shape and not including the inflow port 51 as illustrated in FIG. 13. The sealing member 5A is made of the same material as that of the sealing member 5. Liquid crystal is injected to the inner side of the sealing member 5A before the array substrate 2 and the counter substrate 3 are bonded to each other.

As described above, the light adjustment panel 1A according to the second embodiment includes: the array substrate 2; the counter substrate 3; the liquid crystal layer 4 provided between the array substrate 2 and the counter substrate 3; the sealing member 5 extending along the outer periphery of the liquid crystal layer 4; and the second spacers 71 provided on the inner side of the sealing member 5. The sealing member 5 and the second spacers 71 include the same material.

With this configuration, the sealing member 5 and the second spacers 71 can be formed of the same material with the same equipment (for example, a robot). Thus, work of forming the second spacers 71 can be further simplified.

The material of the sealing member 5 and the second spacers 71 includes the resin 52 and the insulating beads 53 contained in the resin 52. Since the second spacers 71 include the insulating beads 53, the cell gap between the array substrate 2 and the counter substrate 3 can be easily maintained constant while insulation is maintained between the first electrode 200 of the array substrate 2 and the second electrode 300 of the counter substrate 3.

More specifically, in the present embodiment, the second spacer 71 is formed so as to include the insulating bead 53, and the insulating bead 53 has sufficient compressive strength. Consequently, the second spacer 71 has sufficient supporting strength. Needless to say, the insulating bead 53 functions as what is called a support column in each second spacer 71 and contributes to keeping the shape and the attitude of the second spacer 71 that stands erect without any support from other elements in the effective area. In the second spacer 71, the resin 52 is provided around the insulating bead 53, and the second spacer 71 is formed on the alignment film 90, which function as buffer materials to reduce occurrence of damage or the like to the second spacer 71 that would be caused by the second spacer 71 coming in direct contact with electrodes and/or substrates.

The second spacer 71 has a light-transmitting property. With this configuration, light passes through the second spacer 71 as well, whereby decrease in the transmittance of the light adjustment panel 1A due to the presence of the second spacer 71 can be restrained.

What is claimed is:

1. An optical element comprising:
   a first substrate including a first electrode, a first wire connected to the first electrode, and a second wire;
   a second substrate stacked on the first substrate and including a second electrode, the first electrode and the second electrode being provided in an active region, and the first wire and the second wire being provided in an periphery region surrounding the active region in plan view;
   a sealing member surrounding the active region and bonding the second substrate to the first substrate;
   a liquid crystal layer disposed in the active region;
   a first spacer located in the active region; and
   a conductive column located in the periphery region and electrically connecting the second electrode to the second wire,
   wherein the conductive column and the first spacer include the same material, and
   wherein the material of the conductive column and the first spacer includes a resin and a conductive bead contained in the resin.

2. The optical element according to claim 1,
   wherein the first spacer has a column shape.

3. The optical element according to claim 1,
   wherein a plurality of the first spacers are scattered at equal intervals.

4. The optical element according to claim 1,
   wherein the first spacer overlaps with at least one of the first electrode or the second electrode with an insulating layer therebetween.

5. The optical element according to claim 1, wherein the first electrode and the second electrode each having a band shape cross each other in plan view.

6. The optical element according to claim 1,
   wherein the first substrate has a first side and a second side intersecting the first side,
   wherein a first terminal group including a plurality of terminals is provided to the first side,
   wherein a second terminal group including a plurality of terminals is provided to the second side, and
   wherein the first terminal group and the second terminal group are exposed when the second substrate is stacked on the first substrate.

7. The optical element according to claim 6,
   wherein one of the terminals of the first terminal group and one of the terminals of the second terminal group are connected to the first wire.

8. The optical element according to claim 7,
   wherein another one of the terminals of the first terminal group and another one of the terminals of the second terminal group are connected to the second wire.

\* \* \* \* \*